Nov. 10, 1953  V. J. EVANS  2,658,380
CALIBRATOR FOR THERMOSTATS
Filed Jan. 5, 1951  2 Sheets-Sheet 2

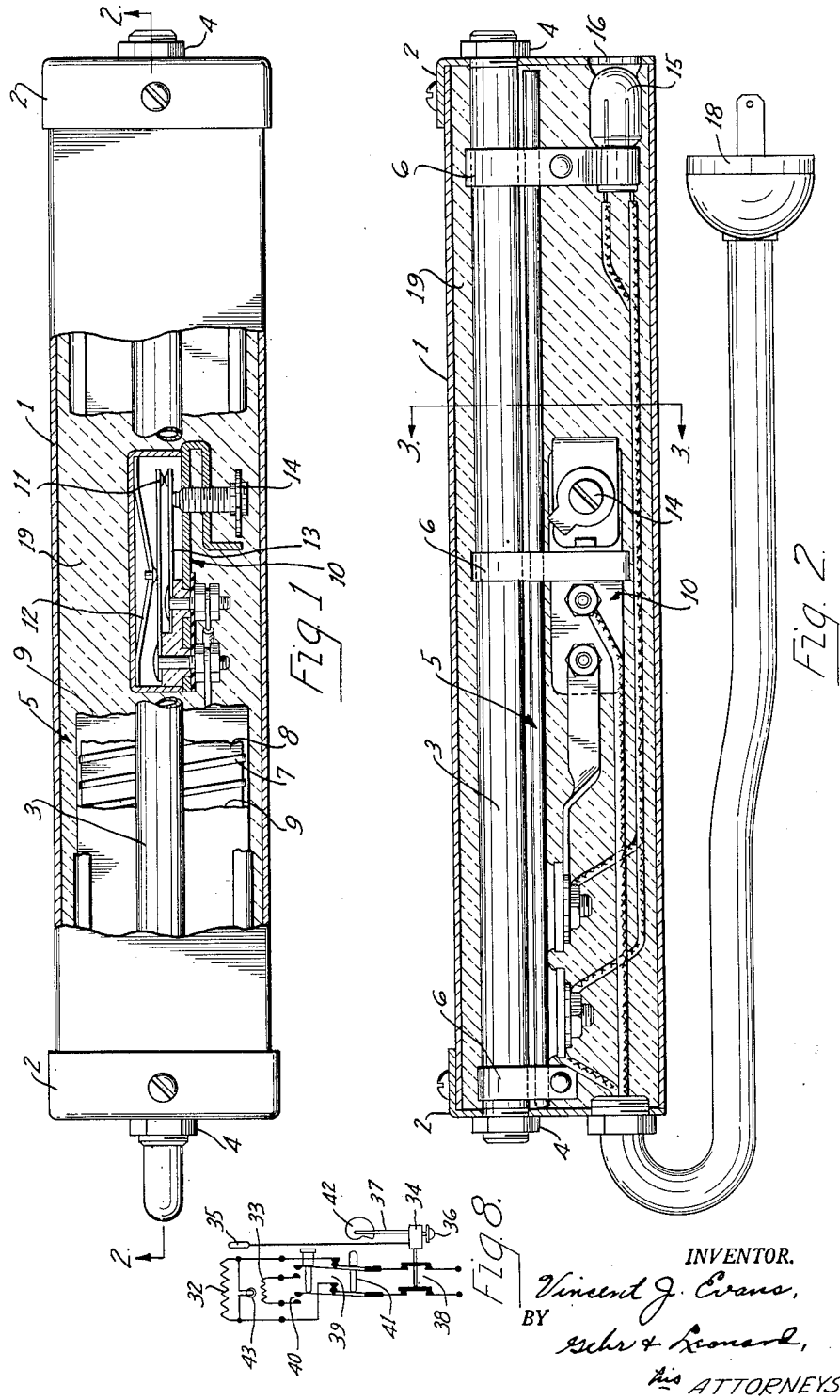

INVENTOR.
Vincent J. Evans,
BY Gehr & Leonard,
his ATTORNEYS.

Patented Nov. 10, 1953

2,658,380

UNITED STATES PATENT OFFICE 2,658,380

CALIBRATOR FOR THERMOSTATS

Vincent J. Evans, Lakewood, Ohio

Application January 5, 1951, Serial No. 204,621

6 Claims. (Cl. 73—1)

In various types of heating equipment, a common practice is to control the heat supplied by settable thermally responsive control device. Though such control devices are carefully calibrated and adjusted at the factory nevertheless in the field they frequently fail to respond accurately to the temperature setting selected by the user and must be recalibrated either in a repair shop or at the site of use.

Typical examples of the uses in which there is need for recalibration and in which difficulties are encountered in the prior methods of recalibration are domestic gas cooking ranges with thermostatically controlled oven burners and the domestic electric cooking ranges with thermostatically controlled oven baking and broiling heating elements.

For purposes of illustration hereinafter the present invention is described as applied to domestic cooking ranges, its use in connection with other equipment and the problems arising in connection with the latter being apparent from the illustrative example.

Domestic gas cooking ranges, for example, usually are provided with an oven burner which is controlled by a thermally responsive device comprising a fluid pressure operated gas valve responsive to the fluid pressure developed by a bulb type thermostat. Domestic electric cooking range ovens usually are provided with electric heating elements which are controlled by thermally responsive devices comprising a fluid pressure operated electric switch responsive to the same bulb type thermostat.

In both of these types of control devices, the thermostat comprises an elongated bulb of small diameter which contains a highly expansible fluid and which is connected by a suitable conduit to a bellows or the like in a sealed system, the bellows in turn being connected to the gas valve or electric switch for operating the same. The device is provided with a control knob by which it can be set to open and close the valve or switch in response to the change of fluid pressure created by the bulb or switch so as to maintain the temperature indicated on a dial carried by the knob. The control device generally is concealed behind the top front panel of the range with a stem extending through the front panel and the knob is mounted adjustably thereon and is accessible from the front of the range. The bulb is arranged in the oven to be controlled.

Considerable difficulty has arisen in the calibrating of such thermally responsive control devices, particularly in the home or workshop. In accordance with the prior methods, the device is adjusted by turning on the heat in the oven, setting the dial to a preselected temperature, usually about 300° Fahrenheit, and then allowing the oven to heat under the control of the thermostat for a period of from forty-five minutes to one hour, depending upon the rate of heating of the particular burner and other characteristics of the range. The purpose of this is to assure that the oven has reached a constant temperature. A suitable thermometer is placed in the oven to determine the actual temperature and, at the instant of opening the oven, is read and then compared with the dial setting. If the dial setting does not agree with the thermometer, the knob set screw is loosened and the knob rotated relative to the stem until the dial reading agrees with the thermometer, and then secured in rotated position. After such setting the thermostat is usually checked again, again allowing a considerable period of time to assure that the oven has reached a constant temperature.

Attempts to shorten the time for testing usually results in improper adjustment and subsequent home service calls for re-adjustment.

It is an object of the present invention to make possible the calibration of such thermally responsive control devices in the oven within a period of five to ten minutes and without the necessity of heating the oven.

In accordance with the present invention a calibrator is provided which comprises essentially a hollow casing of very limited volume in which is an electric heating element operated by the usual household supply of 110 to 115 volts of alternating current and controlled by a normally closed thermostatically operated switch which is adapted to open at a predetermined temperature. A means is provided in the casing for receiving the bulb of the thermally responsive device to be tested so that the bulb is responsive to an accurately predetermined temperature provided by the controlled heating element. All parts in the casing are in close proximity to each other and as a group are surrounded by heat insulating material so as to provide a constant temperature at the received bulb in a matter of five to ten minutes. In some instances two thermostatically operated switches are provided in the calibrator so that the amplitude, that is, both the low "turn-on" temperature and high "cut-off" temperature, of the device being tested can be determined.

For the purposes of illustration, the embodiments of the invention herein described are particularly useful for calibrating thermally responsive control devices one at a time, while they are installed in the ovens of domestic ranges, it being apparent that bench type modifications of the present calibrator can be provided so as to calibrate a large number of such devices concurrently in a workshop when they are disassociated from the ranges.

More specific objects and advantages will become apparent from the following description, wherein reference is made to the drawings, in which:

Fig. 1 is a top plan view of a calibrator embodying the principles of the present invention, part thereof being shown in section for clearness in illustration;

Fig. 2 is a longitudinal vertical sectional view of the calibrator illustrated in Fig. 1 and is taken on line 2—2 of Fig. 1, part thereof being shown in elevation;

Fig. 8 is a diagrammatic illustration and wiring diagram showing the application of the modified form of the invention to an electric oven for both calibrating the control device and checking its amplitude.

Figures 3, 4:
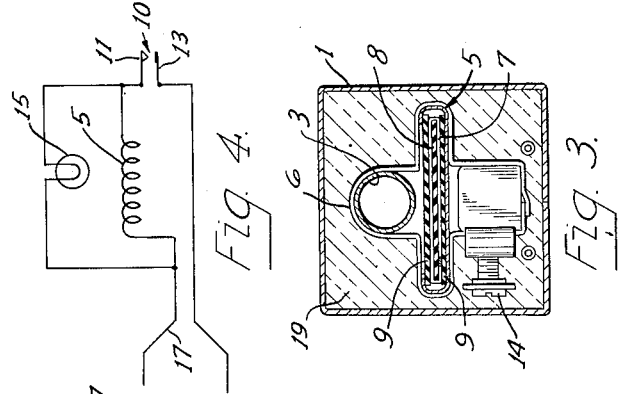
Fig. 3 is a cross sectional view taken on the line 3—3 of Fig. 2.
Fig. 4 is a wiring diagram showing the electric circuit used in the calibrator of Figs. 1 through 3.

Referring first to Figs. 1 through 3, the device comprises essentially an elongated casing 1 of small cross section, which is closed at the ends by suitable caps 2. Mounted within the casing 1 is a supporting means for the bulb of the thermostat to be tested. In the form illustrated, this support comprises a metal tube 3 which preferably extends the full length of the casing and is securely anchored at its ends in the caps 2, for example, by suitable nuts 4, so that the tube acts both as a support for the bulb and as a reinforcing means for the casing itself. The tube 3 extends slightly beyond the ends of the casing 1 and is open at both ends.

Mounted in the casing 1, beneath the tube, is an electrical resistance heating element 5 which is preferably supported from the tube by means of suitable brackets 6 in slightly spaced relation to the tube. The element 5 preferably is coextensive in length with the tube 3 and almost as wide as the casing 1. The heating element may be of the enclosed resistance wire type, the resistance wire 7 being wrapped on a suitable mica core 8 and covered on the outside, in turn, by suitable mica or other heat conducting insulating material 9.

Also mounted within the casing 1 in close proximity to the heating element 5 is a thermostatic electric switch, indicated generally at 10, having a movable make and break contact 11 operated by a suitable low expansion metal bridge 12 and a stationary contact 13. The contact 13 may be adjusted by a suitable screw 14 for varying the position of the contact 13 so as to determine the amount of movement required for the make and break contact 11 to make and break contact, thus predetermining the temperature at which the switch opens and closes.

Within the casing is a pilot light 15 which is visible through a suitable opening or port 16 in the end wall of the casing.

As best illustrated in Fig. 4, the resistance element 5 and pilot light 15 are connected in parallel with each other so that the pilot light indicates the operativeness and inoperativeness of the heating element and cycles on and off therewith. Connected in series with the parallel connected heating element 5 and pilot 15 is a thermostatic switch 10. The main power leads of the circuit, indicated at 17, are provided with the usual saber connections, as indicated at 18, for plugging into the usual wall receptacle so as to connect the calibrator to the usual 110 to 115 volt A. C. power source. All of the elements within the casing 1 are wrapped in suitable heat insulation material 19, such as asbestos or glass fibre, so as to confine all of the heat substantially to the tube or bulb support 3. Thus the thermostatic switch 10 can be set at a predetermined temperature and within ten minutes from cold the tube 3 has reached a constant predetermined temperature.

Figure 5:
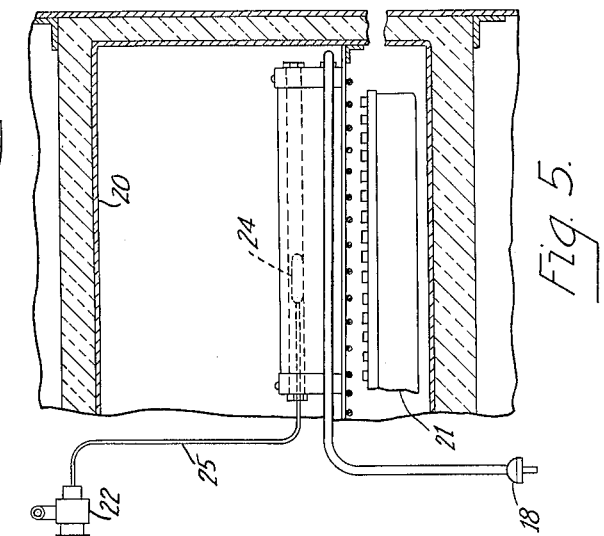
Fig. 5 is a fragmentary diagrammatic side elevation of a portion of an oven of a gas range showing the thermally responsive control device for the burner and the manner in which the present invention is used for calibrating the same.

Referring next to Fig. 5, there is shown an oven 20 of a domestic gas range which is to be heated by a burner 21. Any conventional settable thermally responsive control device 22 is provided for controlling the burner and is regulated by a suitable knob 23 having at its base the usual dial with temperature indicia thereon. The device 22 is operated in response to changes in fluid pressure developed in a thermostatic bulb 24 to which it is connected by means of a suitable easily bendable tube 25, usually of copper.

In order to calibrate the control device, the calibrator of the present invention is placed in the oven on the usual open tray or grid with its pilot light 15 positioned at the bottom and is plugged into the usual household circuit. The bulb 24 is inserted into the tube 3. Within about ten minutes, from cold, the temperature within the tube 3, and that of the bulb, has reached a constant value which has been pre-selected by setting of the thermostat 10. Usually this temperature is 300° Fahrenheit. The bottom pan of the oven is preferably removed so that the oven burner flame can be observed. After the calibrator has remained "on" for about ten minutes, as described, the oven burner is turned on by the knob 23 and lighted, the door of the oven remaining open. The knob 23 is then turned so as to reduce the flame until it is burning on the by-pass circuit which supplies gas only for a temperature below that controlled by the control device. Next, the dial is rotated toward higher temperature slowly until the oven flame increases slightly. This increase indicates that the device 22 has just come under the control of the thermostatic bulb 24 which is calling for more heat. Since the temperature of the bulb 24 as applied by the calibrator is known, the dial of the knob 23 is read and the difference between the dial indication and the true temperature to which the bulb is subjected is determined and the dial set to correspond to the true bulb temperature. Usually the dial is reset by loosening the knob set screw, turning the knob relative to the stem of the device so that the dial indication is that for which the calibrator is set, and then securing the knob against rotation relative to the stem.

The calibrator is then disconnected from the electric circiut and the bulb restored to its original position in the oven.

In an electric oven, it is desirable to check not only the calibration of the thermostatic bulb of the control device for a given temperature but also to check its amplitude. For this purpose the form of the device illustrated in Fig. 6 with the wiring diagram illustrated in Fig. 7 is employed.

Figure 6:
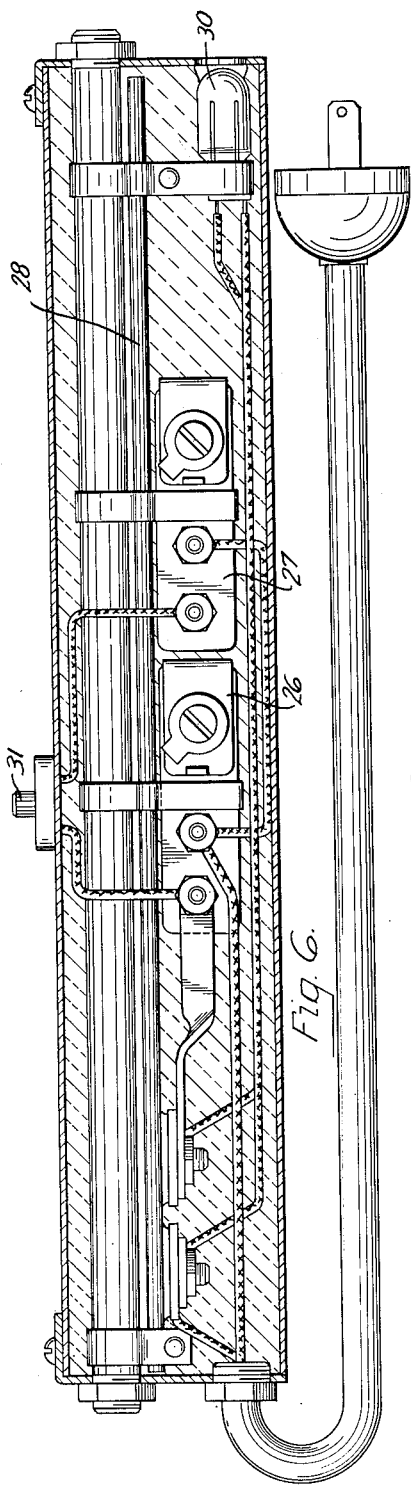
Fig. 6 is a longitudinal sectional view, similar to Fig. 2, showing a modified form of the invention.
Figure 7:
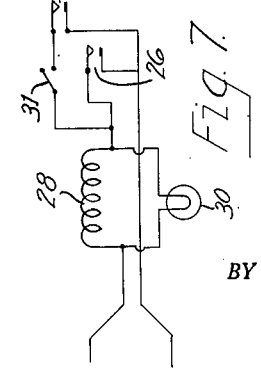
Fig. 7 is a wiring diagram showing the electric circuit employed in the modified form of the invention.

The latter structure, in general, is the same as that heretofore described except that, in addition to a thermostat, such as the thermostat 10 heretofore described, and such as indicated at 26, in Fig. 6, the device is provided with a second thermostat 27. As in the prior device the heating element, indicated at 28, is connected in parallel with the pilot light 30 and the parallel connected element 28 and light 30 are connected in series with the thermostat 26 which operates in the same manner as the thermostat 10 and which is the low temperature thermostat, usually set to open and break the circuit at about 330° Fahrenheit. The additional thermostat 27 is the same type of thermostat as the thermostat 26 but is set to open at a temperature of about 370° Fahrenheit. The thermostat 27 is connected in a by-pass circuit around the thermostat 26, and a manually controlled switch 31 is provided in this by-pass circuit in series with the thermostat 27. Both thermostats are normally closed. With the switch 31 open, this modification of the device is plugged into the usual 110 volt household circuit whereupon it operates in the same manner as the one heretofore described.

To better understand the use of the present invention in the calibration and checking of amplitude of a thermally responsive control device of a domestic electric cooking range oven there is illustrated diagrammatically in Fig. 8 a wiring diagram and the control device of one type of electric range oven.

Referring to Fig. 8, the oven is provided with a baking heating element 32 and a broiling heating element 33 both of which are controlled by means of a thermally responsive control device 34 which preferably is of the expansible fluid type employing an elongated bulb 35 similar to the bulb 24 heretofore described.

The control device 34 is provided with the usual rotatable control knob 36 having indicia thereon designating the temperature and being operable upon rotation to set the control means at the temperature desired. For this purpose, as is usual in such devices, the knob is mounted on an operating stem 37 which is arranged to extend through the front panel of the range. The knob is secured for rotation with the stem 37 by means of a set screw which can be loosened for adjusting the relatively rotated positions of the knob and stem. The control means 34 includes a main thermostatically operated switch 38 for opening and closing the power circuit to the heating elements 32 and 33 in response to the operation of the fluid pressure developed in the bulb 35.

Since the two heating elements 32 and 33 are usually used selectively they are provided also with individual mechanically operated switches. For example, the baking element 32 is provided with a normally closed switch 39 and the broiling element 33 is provided with a normally open switch 40, these switches being arranged between the main thermostatically operated switch 38 and the elements, respectively. The switches 39 and 40 are operated by means of a pin 41 under the control of a cam 42 which is mounted on the stem 37. When the dial 36 is in "off" position the baking element 32 is connected by the switch 39 to the switch 38 and by the latter, when closed, to the source of power. This connection continues for all rotated positions of the knob 36 from "off" toward "on" position until a preselected higher temperature setting, usually above the range of the element 32, is reached, whereupon the normally closed switch 39 is opened by the cam and concurrently the normally open switch is closed, after which the broiling element 33 only is under the control of the switch 38. Thus both elements are selectively brought under the control of the control device 34 and therefore of the bulb 35.

A pilot light 43 is connected in parallel with the baking element 32 to indicate when it is "off" and "on."

In order to calibrate the control device 34, either calibrator described is placed in the oven as heretofore described and the bulb 35 inserted and the calibrator thermostat is set for a preselected temperature; for example, 300° Fahrenheit. After about ten minutes the dial 36, starting at "off" position is turned slowly until the pilot light 43 comes on. The dial 36 is then turned slowly in the opposite direction until the pilot light 43 snaps off. This is repeated several times, the readings being noted. Half way between these readings is the preselected temperature of 300° Fahrenheit. Accordingly, the dial set screw is loosened and the dial 36 is rotated to 300° Fahrenheit, or the preselected temperature, and secured in place.

In order to test the amplitude of the control device of Fig. 8, the calibrator of Figs. 6 and 7 is used. The knob 36 of the control device may be turned to about half way between the high and low temperatures at which the thermostats 26 and 27 are set, respectively. The calibrator is plugged in, the bulb 35 inserted, and allowed to reach constant low temperature. For example, using 330° Fahrenheit for the low limit thermostat 26 and 370° Fahrenheit for the high limit thermostat 27, the knob 36 may be set for 350° Fahrenheit. With the switch 31 closed, the temperature of the calibrator and bulb 35 is raised from 330° Fahrenheit to 370° Fahrenheit. Since the knob is set for 350° Fahrenheit, the bulb 35 should open the switch 38 within a short while after closing of the switch 31 and before the time the thermostat 27 cuts off at 370° Fahrenheit. The opening of the switch 38 is indicated by the pilot light 43 going off. After the bulb 35 opens the switch 38, the switch 31 is opened, whereupon the temperature of the calibrator drops within a short while to 330° Fahrenheit. Before the thermostat 26 closes, however, the bulb 35 should close the switch 38. Such is indicated by the pilot light 43 coming on. Thus the amplitude of response of the control device is readily determined without the time consuming job of repeatedly heating and cooling the oven.

Obviously, the calibrator itself must be maintained operative within accurate limits and is usually set accurately at the time of manufacture. It may be tested either by means of insertion of a thermometer in the tube 3 or by testing it with a thermostatic electric switch known to be accurate, the latter being preferred because it does not have to be connected to any device as the click of its snap mechanism may be heard easily and indicates the temperature reached by it.

As mentioned, the present calibrator is shown for testing one or two thermally responsive devices at a time. Obviously it can be made with a plurality of bulb receiving tubes with a common heating element, or individual heating elements, for use in a workshop where a larger number of control devices, disassociated from the ranges, are to be tested concurrently.

Having thus described my invention, I claim:

1. A calibrator for a thermally responsive control device and comprising a hollow casing, supporting means in, and extending endwise of, the casing and adapted to receive a thermally responsive element of the control device, said casing having an end wall with an opening therein for permitting insertion of the thermally responsive element into the casing in proper position on the supporting means, an electric heating element in the casing and extending endwise thereof alongside of, and in closely spaced relation to, the supporting means, a normally closed thermostatically operated electric switch in the casing closely adjacent the heating element and on the opposite side of the heating element from the supporting means and adapted to open and close at predetermined temperatures, electrical conductor means connecting the switch and heating element in series with each other, and including means accessible from the exterior of the casing adapted for connecting the conductor means to opposite sides, respectively, of a source of power.

2. A calibrator of the type described in claim 1 and characterized in that said supporting means is a tube of heat conducting material and at least at one end extends through an end wall of the casing and is open to permit insertion of the thermally responsive means.

3. A calibrator of the type described in claim 2 characterized in that thermal insulation is disposed in the casing in surrounding relation to the tube and heating element.

4. A calibrator for a thermally responsive control device of the expansible fluid type employing an elongated bulb of small diameter and comprising a hollow elongated casing of small cross section, an elongated metal tube of small diameter extending endwise of the casing and through the end walls thereof and being open at both ends, means securing the ends of the tube to said end walls, respectively, an elongated electrical heating element in the casing and disposed alongside the tube and substantially coextensive endwise therewith, a normally closed thermostatic electric switch in the casing exteriorly of the tube and in close heat exchange relation to the heating element, and electrical conductor means connecting the switch and heating element in series with each other, and including means accessible from the exterior of the casing adapted for connecting the conductors to opposite sides, respectively, of a source of power.

5. A calibrator according to claim 4 characterized in that clamp means are provided and connect said switch and element to the tube so that they are supported by the tube.

6. A calibrator for a thermally responsive control device and comprising a hollow casing, supporting means in the casing adapted to receive a thermally responsive means of the device and to support it in the casing, said casing having a wall with an opening therein aligned with said support for permitting endwise insertion of the thermally responsive means into the casing in proper position on the supporting means, an electric heating element in the casing in closely spaced relation to the supporting means, a normally closed thermostatically operated electric switch in the casing between the supporting means and element and adapted to open and close at predetermined temperatures, electric conductor means connecting the switch and heating element in series with each other and including means accessible from the exterior of the casing adapted for connecting the conductors to opposite sides, respectively, of a source of power, a second normally closed thermostatically operated electric switch in the casing between the supporting means and element and adapted to open and close at a higher temperature than first mentioned switch, a by-pass circuit connecting the second switch in parallel with the first switch and in series with the element, and a normally open manually closable switch connected in the by-pass circuit in series with the second switch and accessible for operation from the exterior of the casing.

VINCENT J. EVANS.

References Cited in the file of this patent

UNITED STATES PATENTS

| Number | Name | Date |
|---|---|---|
| 2,367,985 | Weeks | Jan. 23, 1945 |
| 2,383,756 | Williams | Aug. 28, 1945 |
| 2,456,030 | Sohns | Dec. 14, 1948 |
| 2,541,121 | Sparklin | Feb. 13, 1951 |
| 2,552,087 | Cooper | May 8, 1951 |